United States Patent [19]

Beach

[11] 4,160,588
[45] Jul. 10, 1979

[54] EXPOSURE CONTROL APPARATUS
[75] Inventor: David E. Beach, Penfield, N.Y.
[73] Assignee: Eastman Kodak Company, Rochester, N.Y.
[21] Appl. No.: 891,775
[22] Filed: Mar. 30, 1978
[51] Int. Cl.² .............................................. G03B 7/00
[52] U.S. Cl. ........................................ 354/31; 354/59; 354/60 L
[58] Field of Search ................... 354/31, 53, 59, 60 E, 354/60 L, 289, 42, 49

[56] References Cited

U.S. PATENT DOCUMENTS

| | | | |
|---|---|---|---|
| 3,538,823 | 11/1970 | Wagner | 354/31 X |
| 3,709,113 | 1/1973 | Wood | 354/60 L X |
| 3,824,606 | 7/1974 | Yoshiyama | 354/60 L X |
| 3,860,936 | 1/1975 | Harvey | 354/60 L X |

Primary Examiner—L. T. Hix
Assistant Examiner—William B. Perkey
Attorney, Agent, or Firm—Roger A. Fields

[57] ABSTRACT

In an aperture preferred exposure control apparatus for a photographic camera, scene light is received by an exposure time determining photocell and a low light determining photocell. The received light is attenuated at different rates respectively for the two photocells to change the shutter speed at which a low light signal will result as a function of the particular size exposure aperture selected.

8 Claims, 5 Drawing Figures

EXPOSURE CONTROL APPARATUS

BACKGROUND OF THE INVENTION

1. Field of the Invention

The present invention relates generally to an exposure control apparatus in a photographic camera. More particularly, the invention relates to an exposure control apparatus in which the exposure time is varied as a function of the level of light received from a scene to be photographed and in which a low light signal is provided to indicate that the level of scene light may be too low for a proper film exposure.

2. Description of the Prior Art

Many relatively inexpensive cameras are available today having an exposure control apparatus in which the effective size of the exposure aperture is manually selected and the speed of the shutter is electronically determined as a function of the level of scene light. The electronic shutter in these "aperture preferred" cameras is connected to a light integrating timing circuit for determining the exposure time. Typically, the timing circuit is energized in synchronization with movement of a shutter opening blade to initiate an exposure interval by uncovering the exposure aperture. The timing circuit subsequently actuates a shutter closing blade to terminate the exposure interval by covering the exposure aperture. The closing blade is actuated after a time period established by the timing circuit in accordance with the level of scene light received by a photocell in the circuit. As is well known, the timing circuit can compensate for the particular size exposure aperture selected by adjusting an electrical parameter of the timing circuit to vary its time constant. Often, this adjustment is accomplished by attenuating the effective sensitivity of the photocell in proportion to the exposure aperture setting. This may be done, for example, by placing a neutral density filter or a partially obscuring mask in front of the cell surface.

It is common practice to include another photocell in the camera which receives light from the scene to be photographed. The function of this photocell is to control energization of an indicator lamp in the viewfinder. The indicator lamp is energized when the level of scene light is too low for a proper film exposure at the selected aperture without the aid of a camera support or an auxiliary flash source. In many cameras, the low light indication is provided only when the shutter speed corresponding to the selected aperture is 1/30 sec. or slower. Other cameras provide a low light indication only at a shutter speed of 1/60 sec. or slower. At 1/30 sec. and to a lesser degree at 1/60 sec. or, for that matter, at 1/90 sec., a user of the camera may not be able to hold it steady, with the result that the film image of the scene being photographed is smeared, causing an attendant loss of resolution in the photographic prints made from the film negative.

To reduce the space otherwise occupied in the camera by the separate exposure time determining and low light determining photocells, it is known to use a single photocell structure having two independant photoconductive portions. An example of such a structure is disclosed in U.S. Pat. No. 3,748,974, granted July 31, 1973 in the name of T. D. Cochran. With use of the single photocell structure, placing a neutral density filter or a partially obscuring mask in front of the cell surface to attenuate the effective sensitivity of the photocell will affect the low light signal as well as the shutter speed. Therefore, a low light signal will be provided only at those shutter speeds which are slower than a predetermined shutter speed. For example, a low light signal will be provided only at a shutter speed of 1/30 sec. or slower, or alternatively, only at a shutter speed of 1/60 sec. or slower. No provision is made, however, to change the shutter speed at which a low light signal will result. That is, the shutter speed which corresponds to a low light condition remains the same, regardless of the level of scene light or the particular size exposure aperture selected for use. This situation is depicted in FIG. 3 of the accompanying drawings. FIG. 3 is a diagram of an aperture preferred exposure program having two alternate exposure apertures, f/5.6 and f/9.5, and various shutter speeds ranging from 1/30 sec. to 1/250 sec. As shown in the diagram (which assumes a film ASA speed of 400) a low light signal is provided only at a shutter speed of 1/30 sec. or slower. In operation, the camera user manually sets the exposure aperture at f/9.5 when scene light is thought to be relatively bright. However, if this assessment of scene light is incorrect, that is, if scene light is 30 footlamberts or less, a low light signal is produced because the resulting shutter speed of f/9.5 for 30 footlamberts would be 1/30 sec. The low light signal is produced before the shutter opening blade can be released to uncover the exposure aperture and instructs the camera user to stop up to f/5.6. At f/5.6 the resulting shutter speed for 30 footlamberts would be 1/90 sec. Of course, when the camera user initially sets the exposure aperture at f/5.6 because scene light is thought to be relatively low, a low light signal is produced if scene light is 10 footlamberts or less, since the resulting shutter speed at f/5.6 for 10 footlamberts would be 1/30 sec. Therefore, with the exposure program of FIG. 3, a low light signal is provided only at a shutter speed of 1/30 sec. or slower, regardless of the level of scene light or the particular size exposure aperture selected.

SUMMARY OF THE INVENTION

The previously described problems assocciated with exposure control apparatus are believed solved by the present invention. Specifically, according to the present invention the level of scene light and the exposure time at which a low light indication will result are automatically changed as a function of the particular size exposure aperture selected. This distinction over the prior art can readily be seen by comparing the aperture preferred exposure program depicted in FIG. 3, which is known, and the aperture preferred exposure programs depicted in FIGS. 4 and 5, which are two illustrated examples of exposure programs embodying the present invention. In the exposure programs of FIGS. 4 and 5 (which are discussed in detail below in the DESCRIPTION OF THE PREFERRED EMBODIMENT) the exposure time at which a low light indication will result for different levels of scene light is changed in accordance with the particular size exposure aperture selected.

In keeping with the teachings of the present invention, there is provided the following combination in an exposure control apparatus:

(a) means for selecting any one of a plurality of various size exposure apertures;

(b) means for providing a plurality of exposure times;

(c) a signal emitting source for producing a low light signal to indicate that the level of light received from a scene to be photographed is too low for a proper exposure at the selected aperture; and (d) means operatively associated with said aperture selecting means and said exposure time providing means for changing the level of scene light and the exposure time at which said low light signal is produced in accordance with a change of the selected aperture.

BRIEF DESCRIPTION OF THE DRAWINGS

For a more complete understanding of the present invention, as well as further advantages and features thereof, reference should be had to the following detailed description of the invention taken in conjunction with the accompanying drawings, in which.

DESCRIPTION OF THE PREFERRED EMBODIMENT

Because cameras are well known, this description will be directed in particular to elements forming part of or cooperating directly with apparatus in accordance with the present invention. It is to be understood that camera elements not specifically shown or described may take various forms known to those skilled in the camera art.

Figure 1:
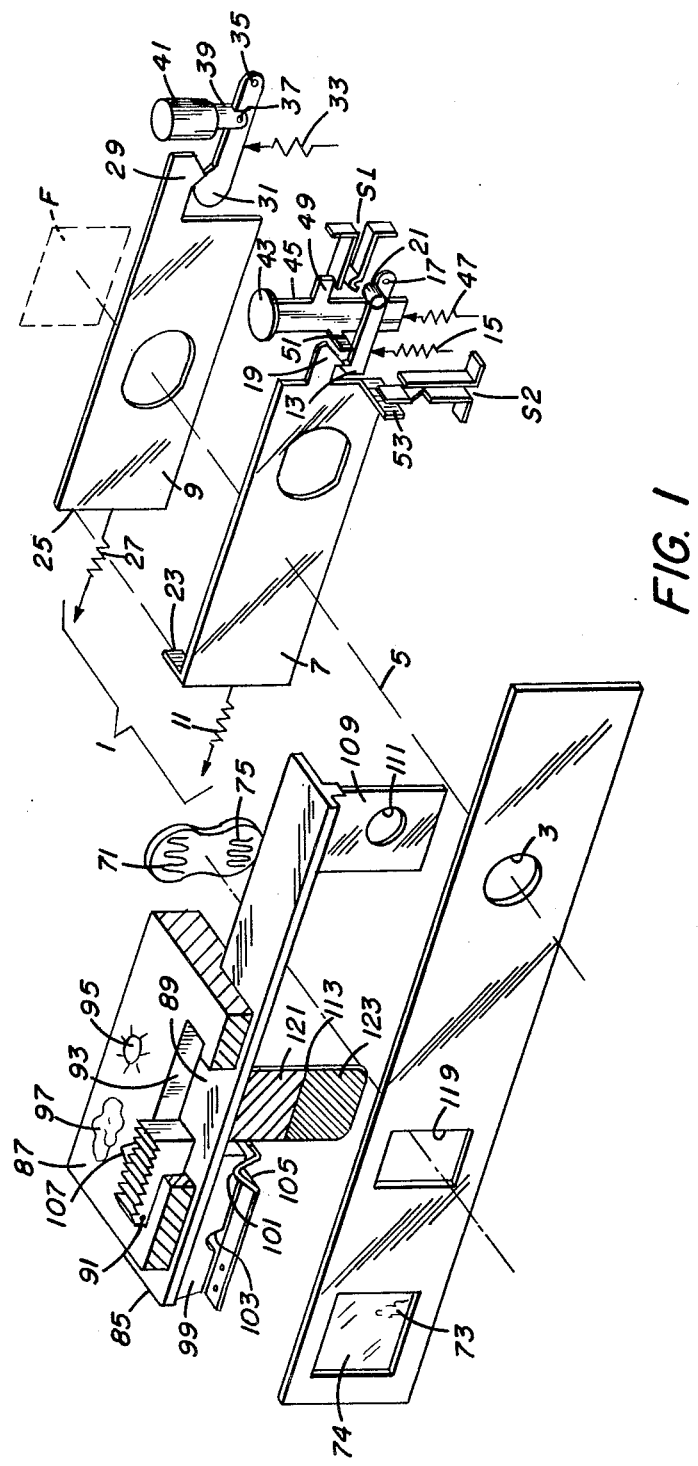
FIG. 1 is an exploded perspective view of an exposure control apparatus in accordance with the teachings of the present invention.

Referring now to the drawings and in particular to FIG. 1, there is shown an exposure control apparatus according to a preferred embodiment of the present invention. The exposure control apparatus includes a known type of a two-bladed shutter mechanism 1, which is shown in FIG. 1 in a cocked position preparatory to actuation for effecting a film exposure. Actuation of the shutter mechanism 1 allows scene light received through a maximum exposure aperture 3 to be projected by a picture taking lens (not shown) along an optical axis 5 and onto a film exposure plane F. The shutter mechanism 1 has a pair of opaque blades 7 and 9 which are slidably mounted on appropriate supports (not shown) for movement relative to the optical axis 5. When the blade 7, which is the "shutter opening" blade in this embodiment, is in its cocked position, as shown in FIG. 1, it is retained against the bias of a spring 11 by a latch 13. The latch 13 is urged by a spring 15, which is stronger than the spring 11, to pivot in a clockwise direction about a mounting pin 17 into latching engagement with a detent member 19 of the opening blade 7. A stop pin 21 limits clockwise pivoting of the latch 13 when the latch is disengaged from the detent member 19. The opening blade 7 has another detent member 23 which, when the opening blade is in its cocked position, is disposed to engage an edge 25 of the shutter blade 9. As a result, the blade 9, which is the "shutter closing" blade in this embodiment, will be retained in its cocked position against the bias of a spring 27. As shown in FIG. 1, in their respective cocked positions, the opening blade 7 is retained in a covering relationship with respect to the maximum exposure aperture 3 and the closing blade 9 is retained in an uncovering relationship with respect to the maximum exposure aperture. When the opening blade 7 and the closing blade 9 are successively released from their respective cocked positions, the opening blade is first urged by the spring 11 to uncover the maximum exposure aperture 3 and the closing blade is then urged by the spring 27 to cover the maximum exposure aperture, respectively initiating and terminating an exposure interval.

The closing blade 9 has another detent member 29 which is disposed for engagement by a latch 31 when the closing blade is in its cocked position, as shown in FIG. 1. A spring 33, which is weaker than the spring 27, urges the latch 31 to pivot in a clockwise direction about a mounting pin 35. The latch 31 is pivotally connected by a fastening pin 37 to an armature 39 of an electromagnet 41. Energization of the electromagnet 41 operates to hold the latch 31, as shown in FIG. 1, against the bias of the spring 27. This enables the latch 31 to retain the closing blade 9 in its uncovering relationship with respect to the maximum exposure aperture 3 when the detent member 23 of the opening blade 7 is separated from the edge 25 of the closing blade, following release of the opening blade by the latch 13. Release of the opening blade 7 allows it to be moved by the spring 11 to uncover the maximum exposure aperture 3 to initiate an exposure interval. Subsequently, when the electromagnet 41 is de-energized, the relatively stronger spring 27 overpowers the relatively weaker spring 33, causing the blade detent 29 to cam the latch 31 in a counterclockwise direction about the mounting pin 35. This releases the closing blade 9 for movement by the spring 27 to cover the maximum exposure aperture 3, which terminates the exposure interval.

For actuation of the shutter mechanism 1 to effect a film exposure, there is provided a shutter release button 43 which is located on the camera exterior for manual depression by a camera operator. The button 43 is fixed to a bar 45 which is slidably mounted on appropriate supports (not shown) for movement in response to manual depression of the button. Initial movement of the bar 45 against the bias of a return spring 47 causes a finger member 49 of the bar to depress a flexible contact of a normally open switch S1, closing the switch. Closure of the switch S1 energizes the electromagnet 41, which then will hold the latch 31 to retain the closing blade 9 in its uncovering relationship with respect to the maximum exposure aperture 3. Continued movement of the bar 45 causes a detent member 51 of the bar to pivot the latch 13 in a counterclockwise direction about its mounting pin 17 and out of engagement with the detent member 19 of the opening blade 7. This releases the opening blade 7 for movement by the spring 11 to uncover the exposure aperture 3. When the opening blade 7 is thus moved out of its cocked position, another detent member 53 of the opening blade separates from a switch S2 which ordinarily is held closed by the detent member. This allows the switch S2 to open for reasons which will become apparent below in the description of an exposure control circuit for the shutter mechanism 1.

It will be appreciated that the normally opened switch S1 and the normally closed switch S2 are arranged for sequential operation initiated respectively by manual depression of the shutter release button 43 and release of the opening blade 7. That is, when the switch S1 is first closed, the switch S2 will remain closed a brief time interval.

Figure 2:
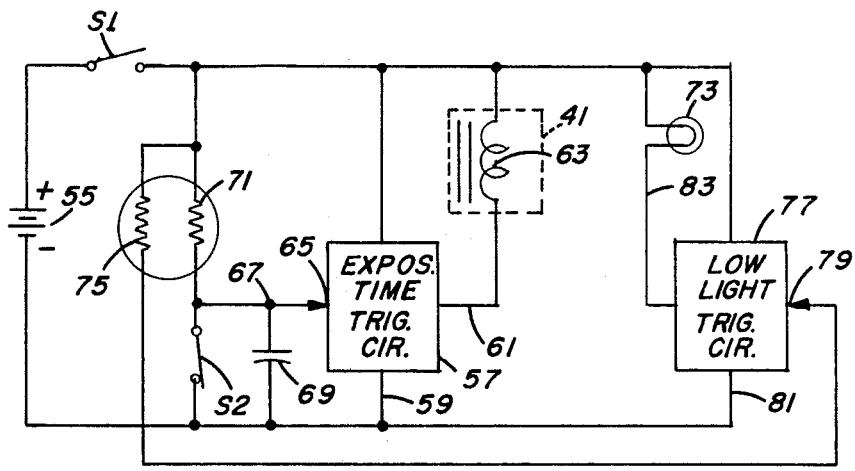
FIG. 2 is a schematic electrical diagram of a control circuit for use in the exposure control apparatus of FIG. 1.

Referring now to FIG. 2, there is shown a known type of an exposure control circuit which is operatively coupled to the shutter mechanism 1. When the shutter release button 43 is initially depressed to close the switch S1, the circuit is energized from a potential source such as a battery 55. Closure of the switch S1 completes the circuit between the battery 55 and a voltage sensitive trigger circuit 57 (which is identified in FIG. 2 as an exposure time trigger circuit). The trigger circuit 57 may illustratively take the form of a well known Schmidt trigger circuit, the output stage of which switches from a conductive state to a nonconductive state when its input voltage level is at or above the threshold voltage level of the trigger circuit. Because of the bias potential applied by the battery 55 to the trigger circuit 57 when the switch S1 is closed, the trigger circuit is energized to assume its conductive state. This established a conductive path between two leads 59 and 61, which permits current to flow through a coil 63 associated with the electromagnet 41. The resulting energization of the electromagnet 41 causes it to hold the latch 31, as shown in FIG. 1, enabling the latch to retain the closing blade 9 in its uncovering relationship with respect to the maximum exposure aperture 3, after the opening blade 7 has moved to initiate an exposure interval by uncovering the exposure aperture.

The trigger circuit 57 has an input terminal 65 which is connected to a common junction point 67 between a capacitor 69 and a photoconductive element 71. The photoconductive element 71 is disposed to receive light from a scene to be photographed and has an electrical parameter, i.e., resistance, that varies in inverse proportion to the level of scene light received by the photoconductive element. As is well known, the capacitor 69 and the photoconductive element 71 form a light integrating timing circuit whose purpose is to control release of the closing blade 9 for terminating the exposure interval. The timing circuit operates to produce a potential signal at the junction point 67 which is applied to the input terminal 65 of the trigger circuit 57. As shown in FIG. 2, the switch S2, which normally is held closed by the detent 53 on the opening blade 7, operates to short circuit the capacitor 69. When, however, the opening blade 7 is released as a result of continued depression of the shutter release button 43, the opening blade moves to uncover the exposure aperture 3, allowing the switch S2 to open. Thus, as the opening blade 7 is released to permit scene light to be projected onto the film plane F, the capacitor 69 begins to charge at a rate inversely proportional to the product of its capacitance and the resistance of the photoconductive element 71, that is, at rate which corresponds to the level of scene light received by the photoconductive element. When the capacitor 69 has charged to the threshold level of the trigger circuit 57, the potential signal applied to the input terminal 65 will cause the output stage of the trigger circuit to switch from its conductive state to its nonconductive state, deenergizing the electromagnet 41. As a result, the latch 31 is no longer held by the electromagnet 41 and the bias of the spring 27 is sufficient to move the closing blade 9 to cover the maximum exposure aperture 3, terminating the exposure interval. If the level of scene light falling on the photoconductive element 71 is high, the charging period of the capacitor—and hence the timing interval before final blade closing is triggered—is comparatively short. In low light, however, the resistance of the photoconductive element 71 increases and the capacitor 69 takes longer to charge, thus leading to a longer exposure time.

The exposure control circuit has a visible signal emitting source, such as an indicator lamp 73 which is located in a camera viewfinder 74, shown in FIG. 1. When the shutter release button 43 is initially depressed to close the switch S1, the lamp 73 is energized if the level of scene light is too low for a normal film exposure (at the selected aperture) without the aid of a camera support or an auxiliary light source. As shown in FIG. 2, to energize the indicator lamp 73, there is provided in the circuit a photoconductive element 75 and a voltage sensitive trigger circuit 77 (which is identified in FIG. 2 as a low light trigger circuit). The photoconductive element 75 has an electrical parameter, i.e., resistance, that varies in inverse proportion to the level of scene light received by the photoconductive element. The trigger circuit 77 may illustratively take the form of a well known Schmidt trigger circuit, the output stage of which switches from a nonconductive state to a conductive state when its input voltage level is at or below the threshold voltage level of the trigger circuit. If scene light received by the photoconductive element 75 is below a particular intensity, the resistance of the element will be sufficient such that the potential signal applied to an input terminal 79 of the trigger circuit 77 will be below the threshold level of the trigger circuit. This establishes a conductive path between two leads 81 and 83, which permits energization of the indicator lamp 73 by the battery 55. When the indicator lamp 73 is energized, the camera operator is informed that scene light is insufficient to provide a normal film exposure without either an auxialiary light source, such as a flash cube, or a tripod for an extended time exposure. If the operator chooses, he may place the camera on the tripod or insert a flash cube in the camera, and continue to depress the shutter release button 43 to actuate the shutter mechanism 1.

Figure 3:
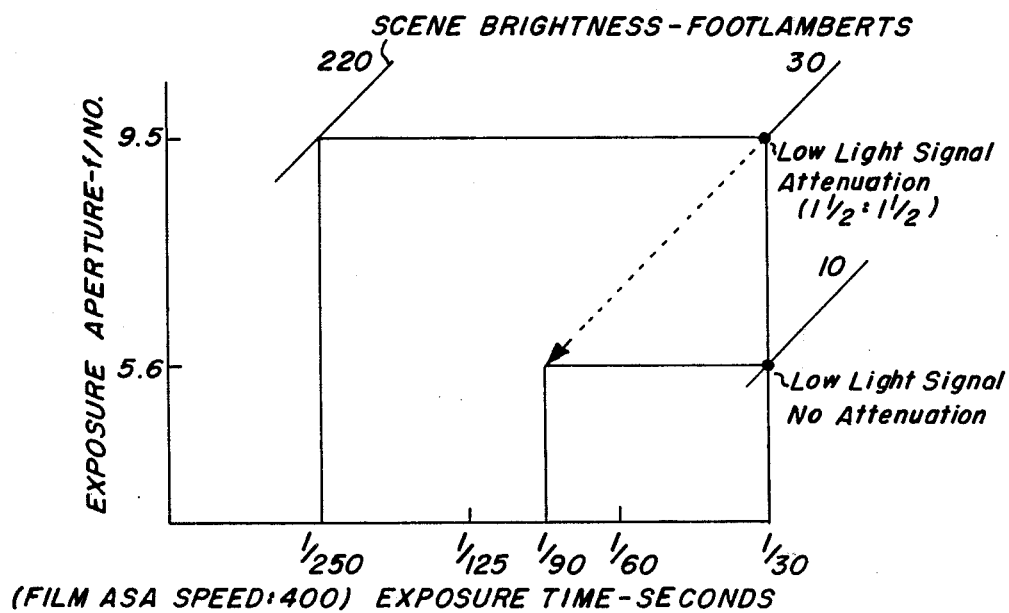
FIG. 3 is a diagram of an aperture preferred exposure program known in the prior art.

Preferably, the photoconductive elements 71 and 75 for exposure time determination and low light determination, respectively, are constructed as two independent photoconductive portions of a single structure. An example of such a structure is shown in FIG. 3 of U.S. Pat. No. 3,748,974. The structure may include a layer of photoconductive material on which is located three discrete electrodes connected respectively to three terminals. The structure operates to provide one photoconductive resistance between a first one and a second one of the terminals and another photoconductive resistance between the first one and a third on of the terminals. Each photoconductive portion of the structure can detect light over the entire field of a scene to be photographed and operates independently of the other.

Referring again to FIG. 1, there is shown a slider 85 which is located below a top wall 87 of the camera. Fixed to an upper side 89 of the slider 85 is an actuating member 91 which projects from a slot 93 in the camera wall 87 for movement by the camera operator. The acutating member 91 is confined to movement along the slot 93, which limits shifting of the slider 85 generally between two settings, a sunny setting 95 and a cloudy setting 97, visible on the camera wall 87. A block-like member 99 depending from the slider 85 has two notches 101 and 103, which alternately receive a flexible detent element 105 when a pointer 107 on the actuating member 91 is aligned with the sunny setting 95 or the cloudy setting 97. The notches 101 and 103 cooperate with the detent element 105 to releaseably secure the slider 85 in either of the two settings 95 and 97. As shown in FIG. 1, a diaphragm plate 109 depends from the slider 85 and has a minimum exposure aperture 111 which is smaller than the maximum exposure aperture 3. When the slider 85 is in the cloudy setting 97, the diaphragm plate 109 is spaced from the optical axis 5 to avoid interfering with scene light received through the larger aperture 3. Moreover, a neutral density filter 113, depending from the slider 85, is spaced from a camera window 119 through which scene light is received by the photoconductive element 71 (for exposure time determination) and the photoconductive element 75 (for low light determination). When the slider 85 is shifted by the camera operator from the cloudy setting 97 to the sunny setting 95, the diaphragm blade 109 is moved to align the smaller or minimum exposure aperture 111 with the larger or maximum exposure aperture 3, thus reducing the effective size of the larger aperture to the particular size of the smaller aperture. Moreover, the neutral density filter 113 is moved to cover the camera window 119, which causes scene light received through the window by the photoconductive elements 71 and 75 to be attenuated to compensate for the reduced aperture size.

Figure 4:
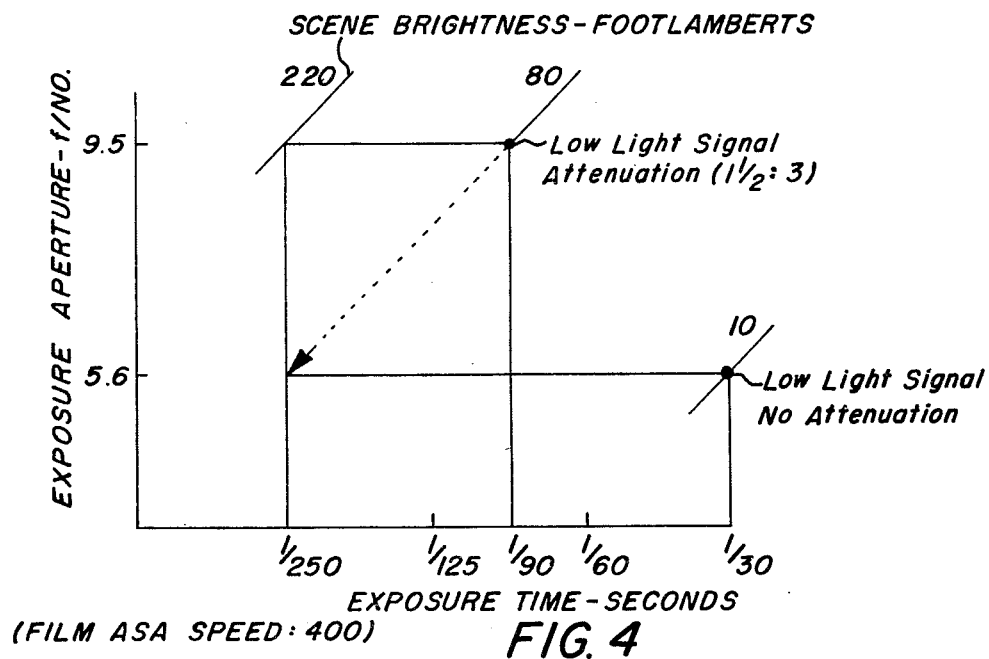
FIGS. 4 and 5 are diagrams of aperture preferred exposure programs embodying the present invention.

For the purpose of illustrating the present invention, the larger aperture 3 may be assumed to provide an f/no. of f/5.6 and the smaller aperture 111 may be assumed to provide an f/no. of f/9.5. Thus, when the slider 85 is in the cloudy setting 97, as shown in FIG. 1, the effective exposure aperture size is f/5.6, but when the slider is shifted to the sunny setting 95, the effective aperture size is reduced or stopped down to f/9.5. In the cloudy setting, i.e., at f/5.6, the indicator lamp 73 may be energized when, for example, the level of scene light received by the exposure time determining photoconductive element 71 is insufficient to produce a shutter speed faster than 1/30 sec. This example is depicted in FIG. 4, which is a diagram of an aperture preferred exposure program in accordance with the present invention. In FIG. 4, the diagonal lines represent different levels of scene brightness or different exposure values as used in the APEX system (Additive System of Photographic Exposure). As shown in FIG. 4, in the sunny setting, i.e., at f/9.5, the indicator lamp 73 is energized when the level of scene light received by the exposure time determining photoconductive element 71 is insufficient to produce a shutter speed faster than 1/90 sec. (as distinguished from the shutter speed of 1/30 sec. for f/5.6). In order to change the shutter speed at which the indicator lamp 73 is energized from 1/30 sec. to 1/90 sec. for the aperture setting of f/9.5, scene light received by the exposure time determining and low light determining photoconductive elements 71 and 75 is attenuated at different rates for the two elements. For this purpose, the neutral density filter 113, as shown in FIG. 1, has upper and lower portions 121 and 123 which are aligned respectively with the exposure time determining photoconductive element 71 and the low light determining photoconductive element 75 when the slider 85 is in the sunny setting 95, i.e., at f/9.5. The density of the upper filter portion 121, which is for regulating shutter speed in the sunny setting, must be directly proportional to the number of stops between f/5.6 and f/9.5, i.e., 1½ aperture stops. The density of the lower filter portion 123, which is for regulating energization of the indicator lamp 73, must be directly proportional to the sum of (a) the number of stops between f/5.6 and f/9.5, i.e., 1½ aperture stops, and (b) the number of stops between 1/30 sec. and 1/90 sec., i.e., 1½ shutter speed stops. Thus, the respective densities of the upper and lower filter portions 121 and 123 differ by a ratio of 1½:3, as shown in FIG. 4. The reason for this variation or ratio between the respective densities of the upper and lower filter portions 121 and 123 is apparent to one having ordinary skill in the exposure control art. When the slider 85 is shifted from the cloudy setting 97 to the sunny setting 95, the effective light responsiveness of the exposure time determining photoconductive element 71 must be attenuated to compensate for the reduction in exposure aperture size from f/5.6 to f/9.5. That is, at a rate equivalent to 1½ aperture stops. If the effective light responsiveness of the low light determining photoconductive element 75 is attenuated at the same rate, i.e., 1½ shutter speed stops, the resulting shutter speed at which the indicator lamp 73 will be energized for an aperture setting of f/9.5 is 1/30 sec. Therefore, to increase the shutter speed at which the indicator lamp 73 is energized from 1/30 sec. to 1/90 sec. for an aperture setting of f/9.5, the effective light responsiveness of the low light determining photoconductive element 75 must be attenuated at a rate that takes into account both the change in the number of aperture stops, i.e., 1½, and the change in the number of shutter speed stops, i.e., 1½. That is, at a rate equivalent to a combined total of 3 stops.

As can be seen in FIG. 4, the exposure time at which the indicator lamp 73 will be energized for different levels of scene light is changed in accordance with the particular size exposure aperture selected. That is, when the camera operator manually sets the aperture size at f/9.5 and scene light is 80 footlamberts or less, the indicator lamp 73 is energized because the resulting shutter speed at f/9.5 for 80 footlamberts is 1/90 sec. (in the example of a film ASA speed of 400). The energized indicator lamp instructs the camera user to increase the aperture size from f/9.5 to f/5.6. At f/5.6, the resulting shutter speed for 80 footlamberts is 1/250 sec. Thus, by changing the aperture size from f/9.5 to f/5.6, the possibility of some smear at 1/90 sec. is avoided. Of course, if the camera operator initially selects an aperture size of f/5.6, the indicator lamp 73 will be energized when scene light is 10 footlamberts or less, since the resulting shutter speed at f/5.6 for 10 footlamberts is 1/30 sec. (in the example of a film ASA speed of 400).

Figure 5:
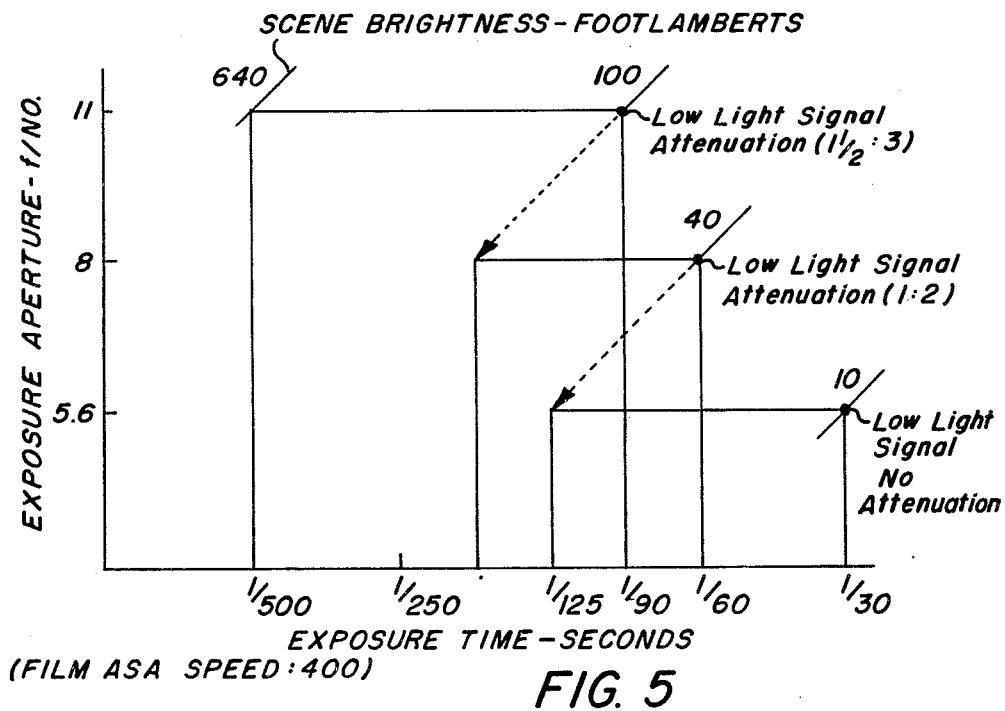

Another exposure program embodying the present invention is depicted in FIG. 5. In FIG. 5, the camera operator can select any one of three aperture sizes f/11, f/8 and f/5.6. At f/11, the indicator lamp 73 is energized when the level of scene light dictates a shutter speed of 1/90 sec. or slower, at f/8 the indicator lamp is energized when the level of scene light dictates a shutter speed of 1/60 sec. or slower, and at f/5.6 the indicator lamp is energized when the level of scene light dictates a shutter speed of 1/30 sec. or slower. At f/8, for example, the upper and lower portions 121 and 123 of the neutral density filter 113 must have respective densities that attenuate scene light falling on the photoconductive elements 71 and 75 at a ratio of 1:2. The attenuation ratio is the ratio of (a) the number of aperture stops between the largest selectable aperture size i.e., f/5.6, and the selected smaller aperture size, i.e., f/8, and (b) the sum of the foregoing number of aperture stops and the number of shutter speed stops between the slowest shutter speed, i.e., 1/30 sec., at which the indicator lamp is to be energized and the faster shutter speed, i.e., 1/60 sec., at which energization of the indicator lamp is desired for the selected aperture, i.e., f/8. In the example of f/11, shown in FIG. 5, the attenuation ratio is 1½:3.

It will now be appreciated that the present invention provides a means for changing the level of scene light and the exposure time at which a low light indication will result as a function of the particular size exposure aperture selected. This can readily be seen by comparing the aperture preferred exposure program depicted in FIG. 3, which is known, and either of the aperture preferred exposure programs depicted in FIGS. 4 and 5, which are illustrative of the present invention.

The invention has been described in detail with particular reference to the preferred embodiment thereof, but it will be understood that variations and modifications can be effected within the spirit and scope of the invention.

I claim:

1. In an exposure control apparatus for a photographic camera, the combination comprising:
   means for selecting any one of a plurality of various size exposure apertures;
   means for providing a plurality of exposure times;
   a signal emitting source for producing a signal to indicate that the level of light received from a scene to be photographed is too low for a proper film exposure at the selected aperture; and
   means operatively associated with said aperture selecting means and said exposure time providing means for changing the level of scene light and the exposure time at which said low light signal is produced in accordance with a change of the selected aperture.

2. The combination as recited in claim 1, wherein said exposure control apparatus is of the aperture preferred type in which said aperture selecting means is manually controllable and in which said exposure time providing means includes a variable speed electronic shutter and photoresponsive means disposed to receive scene light for establishing the exposure time as a function of the level of scene light.

3. In an exposure control apparatus for a photographic camera, the combination comprising:
   means for selecting any one of a plurality of various size exposure apertures;
   means for providing a plurality of exposure times;
   photoelectric circuit means, responsive to the level of light received from a scene to be photographed, for producing a low light signal when the level of scene light is insufficient to effect a predetermined exposure value and for establishing the exposure time as a function of the level of scene light; and
   means operatively associated with said aperture selecting means for influencing said photoelectric circuit means to change the exposure value and the exposure time at which said low light signal is produced as a function of the particular size exposure aperture selected.

4. The combination as recited in claim 3, wherein said influencing means affects said photoelectric circuit means at different rates respectively for changing the exposure value and the exposure time at which said low light signal is produced.

5. The combination as recited in claim 3, wherein said photoelectric circuit means includes first and second photoconductive elements disposed to receive light from a scene to be photographed for respectively providing first and second electrical parameters which are varied as a function of the level of scene light and which operate to produce said low light signal and to establish the exposure time, and wherein said influencing means includes means for attenuating said first and second electrical parameters at different rates respectively for changing the exposure value and the exposure time at which said low light signal is produced.

6. In an exposure control apparatus for a photographic camera, the combination comprising:
   means for manually selecting any one of a plurality of various size exposure apertures;
   a variable speed electronic shutter;
   first light responsive circuit means for receiving light from a scene to be photographed and for regulating the speed of said electronic shutter as a function of the level of scene light;
   second light responsive circuit means for receiving light from the scene to be photographed and for producing a low light signal only when the level of scene light is insufficient to effect a predetermined exposure value; and
   means operatively coupled to said aperture selecting means for adjusting the effective responsiveness of said first and second circuit means at different rates, respectively for changing the exposure value and the shutter speed at which said low light signal is produced as a function of the particular size exposure aperture selected.

7. The combination as recited in claim 6, wherein said first circuit adjusting rate is proportionately related to the number of aperture stops between the largest selectable aperture size and a selected smaller aperture size, and wherein said second circuit adjusting rate is proportionately related to the sum of the number of aperture stops between the largest selectable aperture size and the selected smaller aperture size and the number of shutter speed stops between the slowest shutter speed at which said low light signal can result and a faster shutter speed at which said low light signal is desired for the selected smaller size aperture.

8. The combination as recited in claim 7, wherein said first and second circuit means respectively includes first and second photoconductive elements disposed to receive light from a scene to be photographed for providing electrical parameters which are varied as a function of the level of scene light and which operate to produce said low light signal and to establish the shutter speed, and wherein said means for adjusting the effective responsiveness of said first and second circuit means includes first and second filters which are positionable respectively in front of said first and second photoconductive elements and which have different densities respectively in accordance with said first and second circuit adjusting rates to attenuate said electrical parameters at different rates.

* * * * *